April 28, 1936.　　　　L. R. KEIFFER　　　　2,039,083

LIGHT MEASURING INSTRUMENT

Filed March 29, 1934

Inventor:
Lawrence R. Keiffer,
by Harry E. Dunham
His Attorney.

Patented Apr. 28, 1936

2,039,083

UNITED STATES PATENT OFFICE 2,039,083

LIGHT MEASURING INSTRUMENT

Lawrence R. Keiffer, Cleveland Heights, Ohio, assignor to General Electric Company, a corporation of New York Application March 29, 1934, Serial No. 717,974

6 Claims. (Cl. 88—23)

The present invention relates to electrical measuring devices and more particularly to an instrument which depends upon the use of a photo-electric cell for measuring the intensity of light.

An object of the present invention is to provide a photometer or instrument for measuring light, utilizing a photo-electric cell and having a construction which is compact, rugged, simple to operate and one which will offer adequate protection to the delicate light-sensitive surface while permitting full and extensive use of the instrument. This object is attained in brief, by providing a container provided with a hinged cover, the electrical measuring device being mounted in the body portion of the container and the light-sensitive device in the hinged cover portion.

Figure 1:
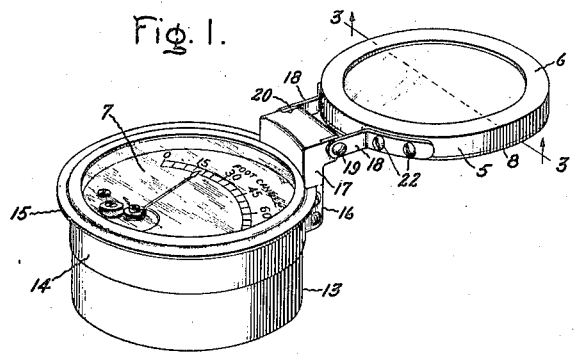
Figure 2:
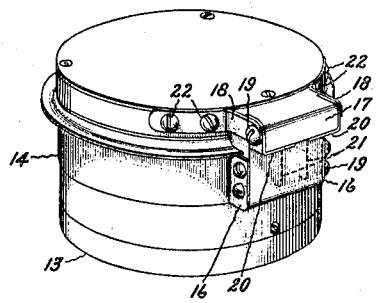

The invention will be better understood when reference is made to the following description and accompanying drawing in which Fig. 1 shows a perspective view of the measuring device with the cover open and the light-sensitive unit in position to receive light. Fig. 2 shows the device with the cover closed, and Fig. 3 is an enlarged cross-sectional view taken along line 3—3 of Fig. 1.

In order to measure the light intensity reaching a given surface, whether vertical or horizontal, the art has generally employed a foot candle meter using a standard incandescent lamp requiring a battery and control, generally known as a visual photometer or one which utilizes a photo-electric tube of the space current type. While meters of this sort give satisfactory service, they are open to the objection that an external source of electro-motive force must be employed to energize the lamp or the tube, and the complete unit including the tube and battery, is often of large weight and bulk. Photometers of this sort cannot readily be carried around in the pocket, especially when provided with a protective case which materially adds to their bulk. These photometers, in addition, are usually expensive. A more specific object of my invention is to provide an improved photometer of small weight and bulk, particularly a reliable device which eliminates the battery or other source of electromotive force and one which is compact and inexpensive.

In carrying out my invention, a photo-electric cell is employed as the light-sensitive unit of the improved instrument, which cell generates its own electro-motive force, and does not require a battery. While any suitable and efficient type of cell may be used for this purpose, I prefer to employ the device disclosed and claimed in the copending application of Clarence W. Hewlett, Serial No. 716,677, filed Mar. 21, 1934 and entitled "Photo-electric cell and manufacturing processes therefor".

Figure 3:
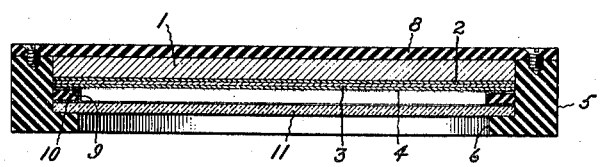

A cell of this sort is shown in Fig. 3, and consists essentially of a circular disk 1 fabricated of a base metal such as iron or nickel. As stated in the Hewlett application, the disk 1 is first ground off to make it smooth and clean, and then sandblasted, in order to give the light-sensitive material 2 which is later deposited thereon, a good grip on the surface. The disk may be mounted in a vacuum chamber and the selenium evaporated in high vacuum and condensed on the sandblasted iron surface. The disk is then heated slightly above the melting point of selenium and the evaporated layer melted. The disk is then quickly cooled and placed in an oven at a temperature of approximately 185° C. and held at this temperature for a period of 24 to 72 hours, the exact time of which may be determined by experiment and depends to some extent upon the initial quality of the selenium employed.

The selenium-covered iron disk is then placed in an evacuated chamber, preferably containing argon at a pressure of about 200 microns, and a thin film of a metal belonging to the second group of elements appearing in the Mendelejeff periodic table, such as cadmium, sputtered onto the selenium, employing a sputtering current of about 50 milliamperes. The sputtering effect is preferably carried out in short flashes so as to avoid heating the selenium surface unduly. During the sputtering process, a flask of liquid air is arranged to penetrate the sputtering chamber so that any condensible vapors may be immediately removed from the discharge.

After the layer of cadmium or similar metal has been deposited on the selenium, the disk is removed from the chamber and laid aside in the air to age until the current-sensitivity of the coated disk comes down to practically zero, at which time the electromotive force generated by the impingement of ambient light on the cell increases rapidly. The aging step is terminated when the electromotive force reaches a maximum.

The cadmium-selenium-coated disk is again placed in the chamber containing argon and a very thin film 4 of platinum or other non-oxidizable metal sputtered on top of the cadmium, the thickness of the platinum being exceedingly thin and just barely seen on the surface. Under some conditions, the platinum may be applied directly to the selenium.

When the last sputtering step is completed, the disk is mounted in a casing 5, preferably fabricated of a phenolic condensation product, and provided at the bottom, on the interior, with an inwardly extending flange 6 serving as a ledge for supporting the various parts of the light-sensitive unit. Conductors are taken from the disk, also from the platinum film in order to apply the electromotive force generated by the cell to the terminals of a microammeter 7 of standard design. The wire connection to the disk may be secured solely by pressure exerted on the upper surface of the disk by a cover 8. The latter may also be constituted of a phenolic condensation product, and is screwed to the casing, as shown more clearly in Fig. 3.

The connection between the other wire and the platinum film is necessarily of a more complicated nature, in view of the thinness of the film. While, perhaps, many ways of making the connection will suggest themselves to those skilled in the art, I prefer to employ, in accordance with the invention disclosed in the Hewlett application referred to hereinbefore, a ring 9 of cardboard, lined on the interior and over the entire bottom surface and partially over the top surface, as shown, with a layer of tinfoil 10. A lead may be inserted between the tinfoil and the cardboard ring, secured thereto in any suitable manner and held in place partly by pressure exerted on the light-sensitive unit by the cover 8. The active surface of the light-sensitive unit, i. e. the area contained within the inner periphery of the cardboard ring 10 may be protected, if desired, by a coating of transparent lacquer, but I prefer to employ a glass window 11 which when assembled with the remaining parts of the light-sensitive unit, is interposed between the lower layer of the tinfoil and the ledge formed on the casing.

As stated in the Hewlett application which contains claims on the light-sensitive unit per se, as described hereinbefore, a cell of this type is capable of generating 100 to 300 microamperes per lumen, which clearly enables such a device to measure directly the intensity of light of practical magnitudes, for example, daylight and artificial light. Moreover, such a unit responds practically linearly to the intensity of the light impinging thereon.

In accordance with the present invention, the improved light-sensitive unit is not only associated with an electrical meter for measuring directly in foot candles, the light which impinges on the unit but the meter and light-sensitive unit are brought together into a structural arrangement which is not only convenient to use and to carry around, and is inexpensive and compact, but also provides considerable protection to both the light-sensitive unit as well as the meter, without involving any other element than the two devices of which the photometer is essentially composed.

In general, these desirable objects are brought about by mounting the light-sensitive unit in a casing which constitutes a cover for the electrical meter, the casing being so secured to the meter as to enable the same to be placed in an exposed position when open but to serve as a protective device for the meter when in the closed position. While various ways of so mounting the cover on the meter that it will have these functions will occur to those skilled in the art, I prefer to mount the cover on hinges which are secured to the meter. Referring to Fig. 1, it will be noted that the electrical meter 7 is housed within a conventional container 13 of insulating material. About the container 13 there is a metal band 14 which fits snugly around the container directly under the flange or lip 15 provided on the container. This band, as shown more clearly in Fig. 2, terminates in two parallelly arranged extensions 16 which hold between them a block of insulating material 17, preferably of the same material as that out of which the container 13 is made. The block 17 extends upwardly and outwardly and terminates in bearing surfaces for a pair of metal members 18. One end of each member 18 is rotatably mounted on the block 17, as a hinge, by means of screws 19 and at their other ends, are bent outwardly to conform to the periphery of the casing 5. Between the hinged portion of each member 18 and the block 17, there is a metal plate 20 which extends partially over the sides of the block and partially underneath, the purpose of which is to carry an electrical contact between each member 18 and a wire 21, shown in dotted line in Fig. 2, which passes through the container 13 into the meter 7. The members 18 are secured to the casing 5 by means of screws 22 and one of the screws in each of the members is connected to a wire which terminates respectively at the iron disk 1 of the light-sensitive unit and the metal film 4. Thus there is an electrical connection between the iron disk and one side of the meter 7, also between the outer metal film and the other side of the meter, these connections passing through the hinged metal strips 18 and the conductors 21 which are concealed within the block 17.

As stated hereinbefore, the meter 7 is calibrated to read directly in foot candles so that when the light-sensitive unit is in an exposed position as shown in Fig. 1, light impinging on the unit and passing through the glass window 11 and the various metal and selenium layers produces an electromotive force which is transferred in terms of an electric current to the meter 7 which will then indicate directly the intensity of the light in foot candles impinging on the light-sensitive unit.

If the light were striking the light-sensitive unit from directly overhead, then the light-sensitive unit would be swung to its horizontal position, as shown in Fig. 1, whereas if the light were coming from the side, the unit would be swung to its vertical position so that the light could strike the unit in a normal direction. Any intermediate position of course can be assumed by the light-sensitive unit, due to the hinge connection and in all of these positions, the meter will register the intensity of light which actually reaches the light-sensitive unit. Obviously, the indications of the meter will tell at a glance the level of illumination or the intensity of light falling on the particular surface on which light is being used.

When the device is not being used, as for example when it is being transported from one place to another, the light-sensitive unit may be rotated at the hinges so that the flanged portion 6 of the unit contacts with the upper or bearing surface of the meter 7 in which case the member 8 of the unit constitutes not only a protective cover for the light-sensitive member but also for the meter. The instrument in its closed condition is shown in Fig. 2, and it is obvious that all parts of the instrument including the delicate meter and light-sensitive surfaces are adequately protected from mechanical injury and yet the arrangement is such that the device is ready to be used instantly by simply opening the cover which exposes to view both the meter and light-sensitive unit. As stated hereinbefore, no batteries or other sources of electromotive force are necessary in a device of this sort so that the instrument as a whole may be made very small and compact and is readily adaptable to the existing types of microammeters which may be readily calibrated to read foot candles directly. As giving some indication as to the compactness and portability of the improved instrument, the drawing in Figs. 1 and 2 shows the approximate full size of a device which has been found to register in a practical manner, all ordinary light intensities, including daylight and artificial light.

What I claim as new and desire to secure by Letters Patent of the United States is:

1. A photometer comprising a container and a cover pivotally mounted upon said container, means mounted on said cover for generating electromotive force when exposed to light, and an electrical measuring instrument in said container connected to said means.

2. A photometer comprising a container and a cover therefor mounted on hinges, a photo-electric cell secured to said cover, a light-measuring indicator in said container and electrically connected through said hinges to said cell.

3. In combination, a photo-electric cell having a light-sensitive surface, a light-measuring instrument electrically connected thereto, said cell being hinged to said instrument so that its light-sensitive surface may be exposed to the light to be measured when in an active position, said cell having its light-sensitive surface adapted to cover the reading face of said instrument when in a closed inactive position.

4. In combination, a photo-electric cell, a cover over the inactive portion of said cell, a light-measuring instrument electrically connected to said cell, a container for said instrument covering all portions thereof except the reading face, said cell being hinged to said instrument and having its light-sensitive surface adjacent the reading face of said instrument when in a closed inactive position whereby the light-sensitive surface of the cell and the reading face of the instrument are mutually protected by one another.

5. In combination, a current-measuring device calibrated in light units, a metal band surrounding said device and secured thereto, said band carrying a block of insulating material, a pair of metal strips rotatably mounted on said block, a photo-electric cell secured to said strips, and electrical connections between said device, said strips and said cell, said connections being concealed in said block.

6. In combination in a portable photometer, an electric meter, a housing for said meter, a photocell of flat formation, a casing for supporting said photocell, means for pivotally securing said casing on said housing whereby it may be turned to protecting position over said housing or to operative light exposed position away from said housing and means providing electrically conductive connection between said photocell and said meter.

LAWRENCE R. KEIFFER.